United States Patent [19]

Terui et al.

[11] Patent Number: 4,695,148

[45] Date of Patent: Sep. 22, 1987

[54] FLASH PHOTOGRAPHING SYSTEM

[75] Inventors: Nobuhiko Terui, Tokyo; Hisatoshi Takahata, Sakura, both of Japan

[73] Assignee: Nippon Kogaku K. K., Tokyo, Japan

[21] Appl. No.: 861,712

[22] Filed: May 12, 1986

[30] Foreign Application Priority Data

May 15, 1985 [JP] Japan ................................ 60-103361

[51] Int. Cl.[4] ............................................. G03B 15/03
[52] U.S. Cl. .................... 354/413; 354/416; 354/484; 354/145.1
[58] Field of Search ............... 354/412, 413, 414, 415, 354/416, 417, 418, 419, 420, 421, 422, 423, 484, 145.1

[56] References Cited

U.S. PATENT DOCUMENTS

| | | | |
|---|---|---|---|
| 4,422,744 | 12/1983 | Maida | 354/413 |
| 4,436,396 | 3/1984 | Maida | 354/145.1 |
| 4,514,073 | 4/1985 | Taniguchi et al. | 354/416 |
| 4,550,996 | 11/1985 | Taniguchi et al. | 354/416 |
| 4,558,939 | 12/1985 | Taniguchi et al. | 354/416 |
| 4,573,786 | 3/1986 | Taniguchi et al. | 354/416 |
| 4,595,267 | 6/1986 | Kuroki | 354/413 |

*Primary Examiner*—Russell E. Adams
*Attorney, Agent, or Firm*—Shapiro and Shapiro

[57] ABSTRACT

Flash photographing system comprises a camera and a flash unit, which are exchangeable data. The flash unit is provided with a control circuit transmitting a power source control signal to a camera when a power source switch of the camera is not turned on, thereby enabling data exchange between the camera and the flash unit.

4 Claims, 12 Drawing Figures

CAMERA MAIN ROUTINE

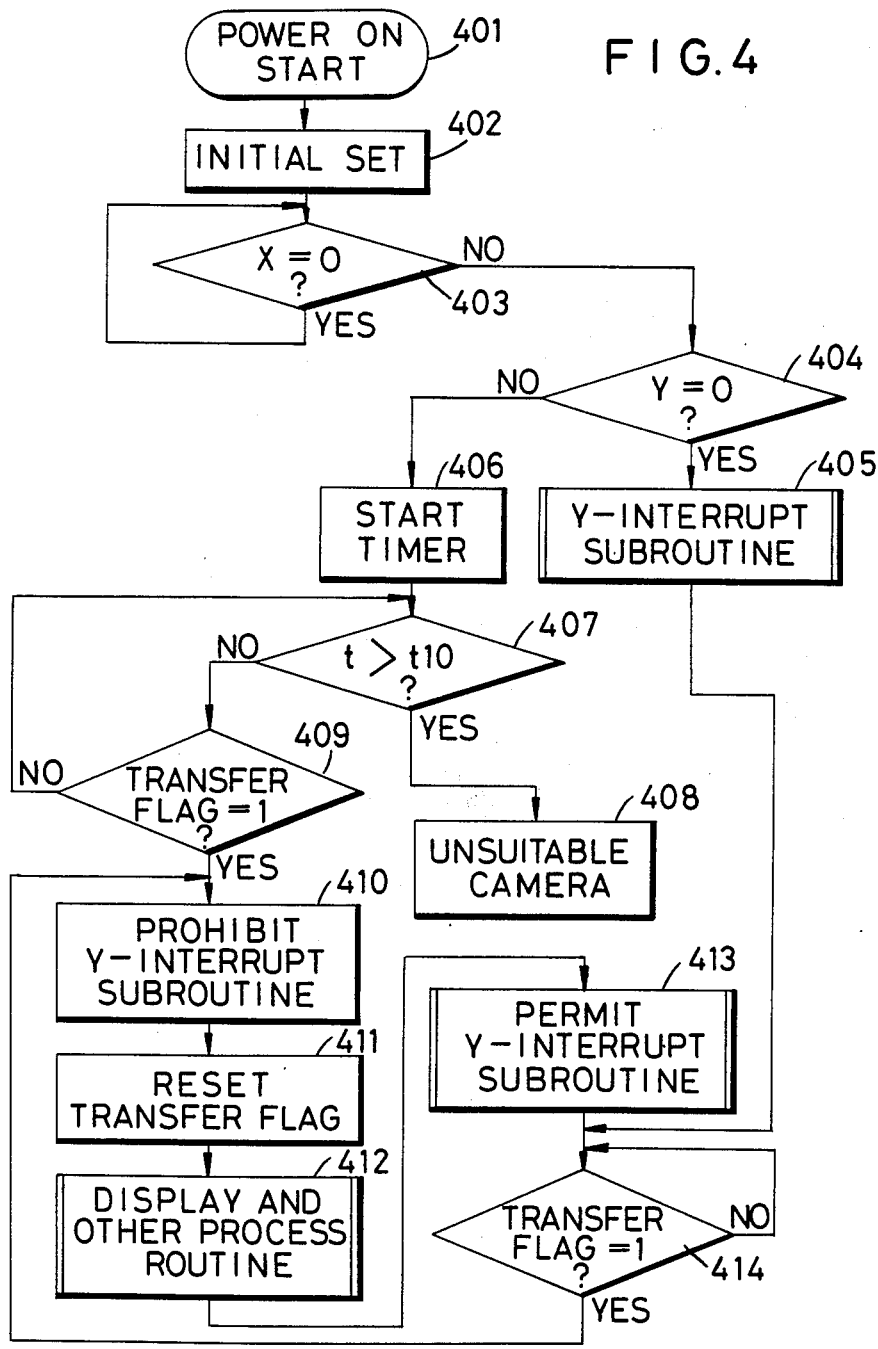

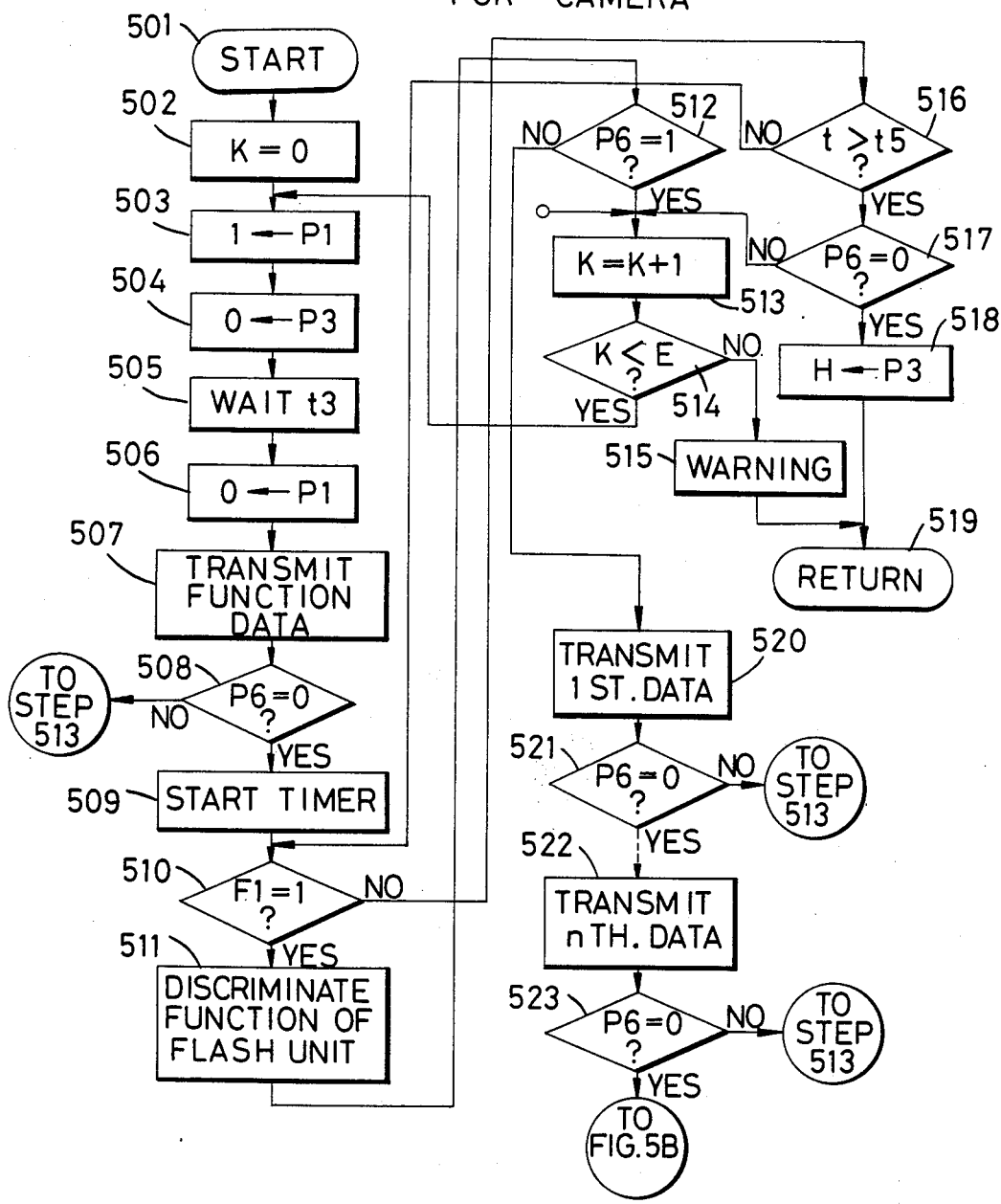

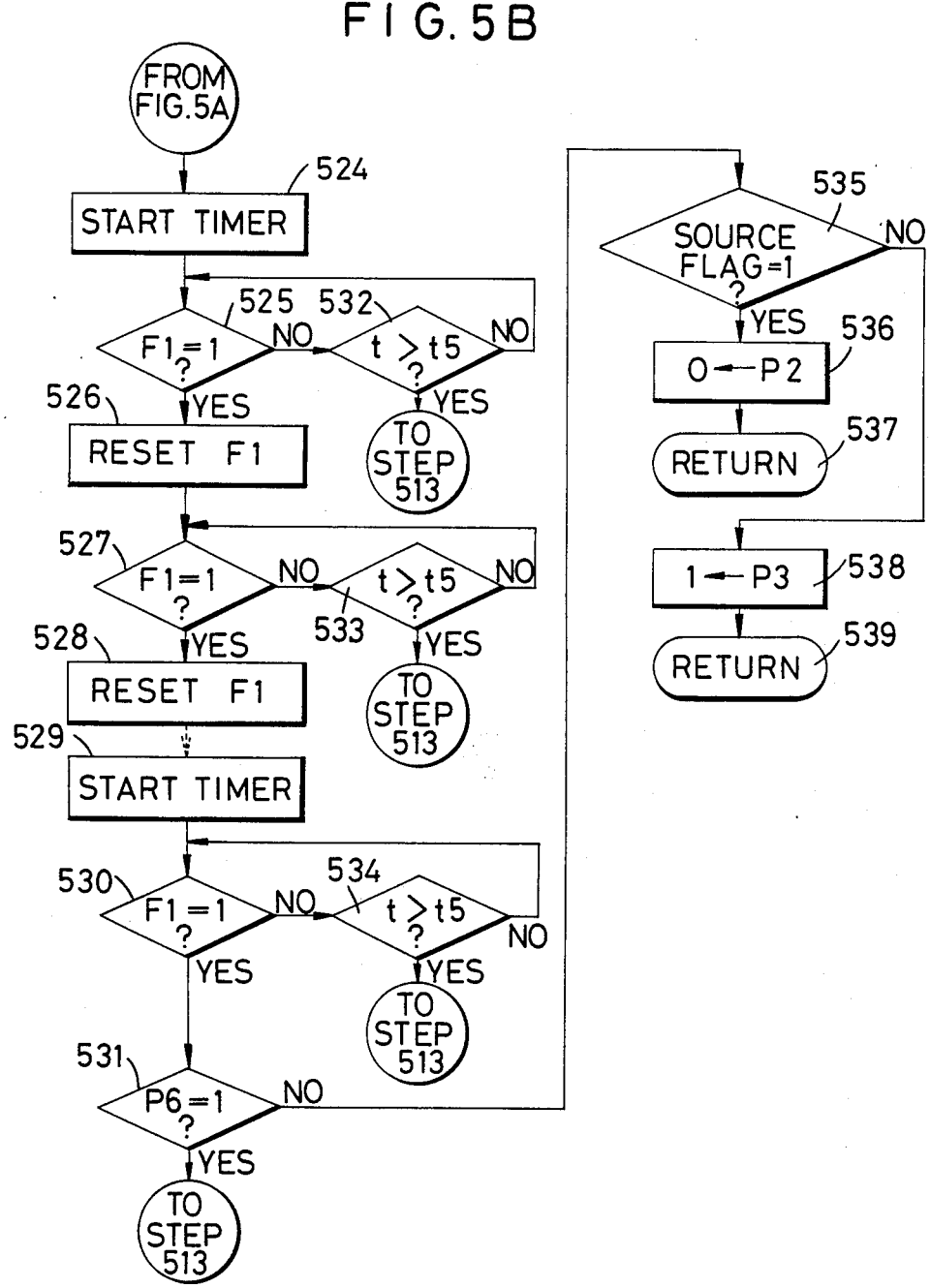

X-INTERRUPT SUBROUTINE

POWER SOURCE CONTROL SUBROUTINE

FLASH PHOTOGRAPHING SYSTEM

BACKGROUND OF THE INVENTION

1. Field of the Invention

The present invention relates to a flash photographing system having a camera and a flash unit.

2. Related Background Art

In a conventional flash photographing system, a charge complete signal is supplied from a flash unit to a camera when a charge voltage of a main capacitor for supplying emission energy to a discharge tube of the flash unit reaches a predetermined value.

In order to systemize combinations of flash units and cameras, automate flash photographing, and apply flash photographing in a variety of applications, in addition to the charge complete signal, flash unit control data such as maximum flash light amount is required at the camera side, and other data such as F numbers of lenses and film speeds is required at the flash unit side. Such data must be exchanged between the camera and the corresponding flash unit.

SUMMARY OF THE INVENTION

It is an object of the present invention to provide a flash photographing system for exchanging data between a camera and a flash unit coupled thereto.

It is another object of the present invention to provide a flash photographing system in which the flash unit drives the power source circuit of the camera regardless of the ON/OFF state of the camera power source switch, so as to allow data transfer.

It is still another object of the present invention to provide a flash photographing system using common terminals for exchanging data between the camera and the flash unit.

BRIEF DESCRIPTION OF THE DRAWINGS

FIG. 4 is a flow chart for explaining the main operation of the flash unit;

FIG. 5 is a flow chart for explaining the data transfer operation of the camera;

DESCRIPTION OF THE PREFERRED EMBODIMENT

Figure 1:
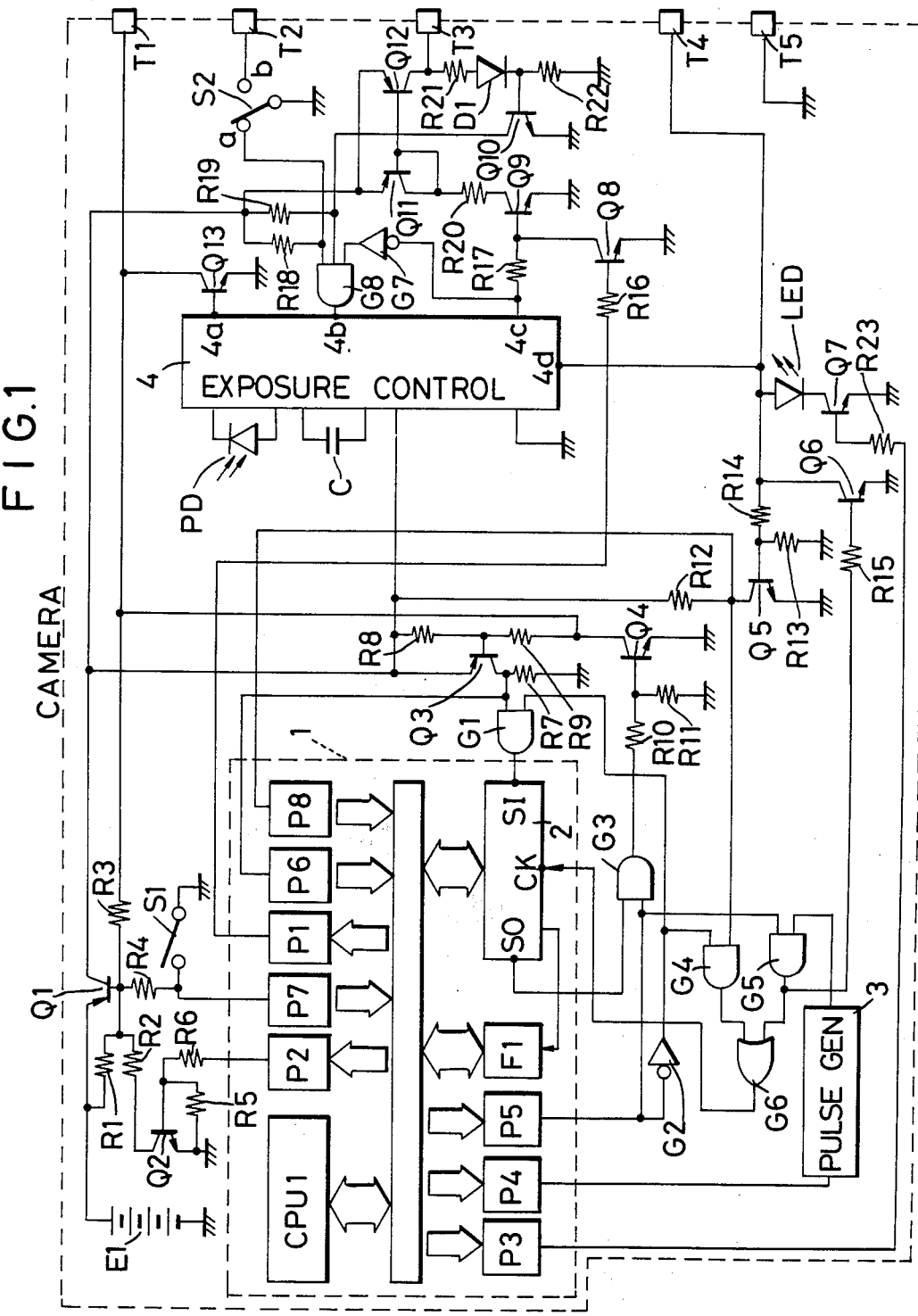
FIG. 1 is a circuit diagram of a camera according to an embodiment of the present invention.
Figure 2:
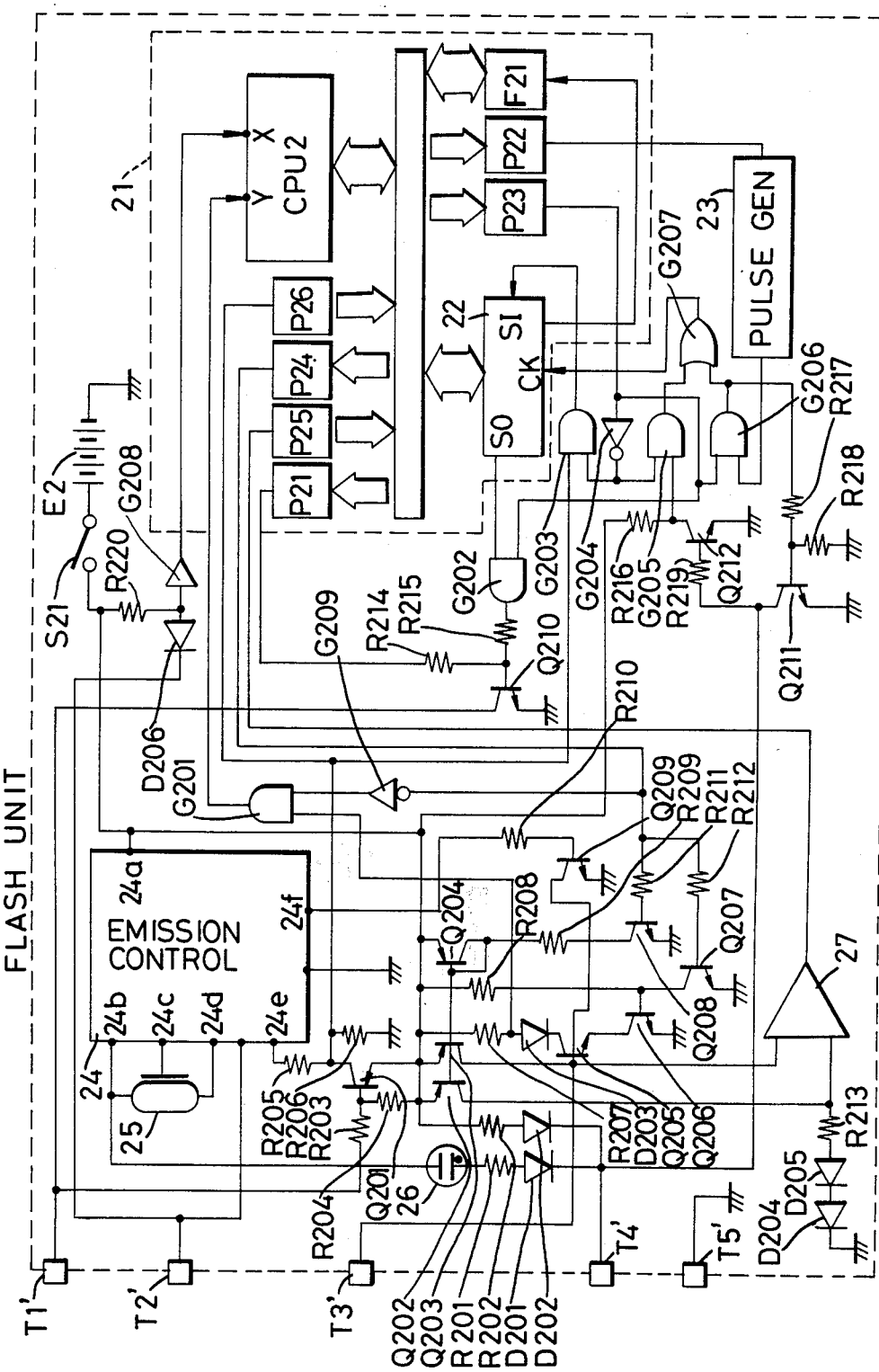
FIG. 2 is a circuit diagram of a flash unit coupled to the camera in FIG. 1.

When a flash unit FIG. 2 is attached to a camera in FIG. 1, camera terminals T1 to T5 are respectively connected to flash unit terminals T1' to T5' to constitute a flash photographing system.

The circuit arrangement of the camera will be described with reference to FIG. 1. A one-chip microcomputer 1 has a central processing unit CPU 1 including a ROM, a RAM and a timer, input/output ports P1 to P8, and a data input/output device 2. A pulse generator 3 supplies a pulse signal having a predetermined number of bits (8 bits in this embodiment) to the data input/output device 2 when the output port P4 goes high.

A TTL light emission control photodetector PD and a TTL light emission control integrating capacitor C are connected to an exposure control circuit 4. When an input terminal 4b of the exposure control circuit 4 goes high in synchronism with light emission of the flash unit, the control circuit 4 charges the integrating capacitor C. When the capacitor C is charged to a predetermined level, a high level signal appears at an output terminal 4a of the control circuit 4 to turn on a transistor Q13. The camera terminal T1 thus goes low. An output terminal 4c is normally set at high level and goes low at the time of shutter release. When flash emission is detected to be completed, the output terminal 4C goes high. The exposure control circuit 4 sets a shutter speed to be synchronized with flash emission when a current is supplied to a terminal 4d thereof. When a power switch S1 is closed, a transistor Q1 is turned on and power is supplied from a power source E1 to the respective components of the camera circuit.

A switch S2 is normally set in a position of a contact a. When shutter opening blades are driven to fully open an exposure aperture, the switch S2 is switched over to a position of a contact b to ground the camera terminal T2.

The base of a transistor Q9 is connected to the terminal 4c through a resistor R17 and is normally rendered conductive. A transistor Q10 is rendered conductive through a current mirror circuit of transistors Q11 and Q12, a resistor R21, and a diode D1.

The circuit arrangement of a data transfer section in the camera will be described below.

When serial data is supplied to the data input/output device 2, the CPUI supplies a low level signal to the output port P5. Therefore, an output from an inverter G2 goes high and data transmission AND gates G3 and G5 are closed to turn off transistors Q4 and Q6.

When a clock pulse is sent from the flash unit to the terminal T4, a transistor Q5 repeats on/off operation. Clock pulses are supplied to a clock input terminal CK of the data input/output device 2 through an AND gate G4 and an OR gate G6.

The 8-bit data supplied from the flash unit to the terminal T1 in synchronism with the clock pulses input to the terminal T4 causes a transistor Q3 to turn on/off according to the contents of the data and is supplied to a data input terminal S1 through an AND gate G1. In this case, when eight pulses are input to the clock input terminal CK, 8-bit data input operation is detected to be completed. A flag F1 is set to acknowledge the end of data input to the CPU1.

In the data transmission mode of the data input/output device 2, the CPU1 supplies a high level signal to the output port P5. An output from the inverter G2 goes low and the AND gates G1 and G4 are closed. When the output port P4 is set at high level, the pulse generator 3 generates a clock pulse which is supplied to the clock input terminal CK through the AND gate G5 and the OR gate G6. The transistor Q6 repeats the on/off operation in response to the clock pulses so that clock pulses appear at the terminal T4. In this case, 8-bit data appears at a data output terminal SO in response to the clock pulses. The 8-bit data is transmitted to the terminal T1 through the AND gate G3 and the transistor Q4. When eight pulses are input to the clock input terminal CK, data output operation of the camera is detected to be completed and the flag F1 is set. The CPU1 determines the end of data transmission.

The circuit arrangement of the flash unit will be described with reference to FIG. 2. A one-chip microcomputer 21 comprises a CPU2 including a ROM, a RAM, and a timer, input/output ports P21 to P26, and a data input/output device 22. When the output port P22 goes high, a pulse generator 23 generates clock pulses. The CPU2 has interrupt input terminals X and Y.

An emission control circuit 24 controls the on/off operation of a flash tube 25. The control circuit 24 has a power input terminal 24a, a boosted voltage output terminal 24b a trigger voltage output terminal 24c, an emission start signal input terminal 24d, an emission stop signal input terminal 24e, and a terminal 24f for outputting an emission signal responding to emission of the flash tube 25 and for turning on a transistor Q20.

A current from a resistor R202 and a diode D202 is supplied to a terminal T4'. When a voltage enough for emission of the flash tube 25 is prepared in the emission control circuit 24, a neon tube 26 is rendered conductive through the terminal 24b. A large current is supplied to the terminal T4' through a resistor R201 and a diode D201. The large current causes a camera ready lamp LED to turn on through the terminal T4 to indicate that the flash unit is ready for operation. When data transfer occurs between the camera and the flash unit is performed, the output port P3 is set at low level and the lamp LED is not turned on.

Since the output port P24 is normally set at low level, transistors Q207 and Q208 are kept off. A current mirror circuit of transistors Q202, Q203, and Q204 is rendered inoperative. An output from an inverter G209 is set at high level. Since a transistor Q206 is turned on, an output from a NAND gate G201 goes high in response to the on operation of a transistor Q205. A high level signal is then supplied to the Y-interrupt terminal of the CPU2.

When the output port P24 goes high, the output from the inverter G209 goes low. The Y-interrupt terminal is kept at high level regardless of the operation state of the transistor Q205. Since the transistors Q207 and Q208 are ON, the transistor Q206 is turned off and the current mirror circuit of the transistors Q202 to Q204 is operated. Upon operation of the current mirror circuit, a current is output from the collector of the transistor Q203 to the terminal T3'. At this time, a current from the transistor Q202 causes generation of a voltage across diodes D204 and D205 and a resistor R213. This voltage is supplied to the inverting input terminal of a comparator 27. A voltage at the terminal T3' is input to the noninverting input terminal of the comparator 27. An output from the comparator 27 is supplied as a high or low level signal to the input port P25 according to a voltage level at the terminal T3'. When the flash tube 25 is operated, a transistor Q209 is turned on to set the terminal T3' at low level.

The data transfer section of the flash unit will be described below. The CPU2 sets the output port P23 at low level when data is received by the data input/output device 22. An output from an inverter G204 goes high, outputs from AND gates G202 and G206 go low, and transistors Q210 and Q211 are turned off. The gates G202 and G206 used for data transfer are closed. At this time, if clock pulses are supplied from the camera to the terminal T4', a transistor Q212 repeats the on/off operation and clock pulses are supplied to a clock input terminal CK of the data input/output device 22 through an OR gate G207. When 8-bit data is input from the camera to the terminal T1' in response to the clock pulses, a transistor Q201 is turned on/off according to the contents of the data. The data is input to the data input terminal SI through an AND gate G203. The data input/output device 22 completes data input when 9 clock pulses are supplied thereto and sets a flag F21. The CPU2 is thus acknowledged that data reception is completed.

In the data transmission mode of the data input/output device 22, the CPU2 sets the output port P23 at high level. Since an output from an inverter G204 is set at low level, outputs from the AND gates G203 and G205 are set at low level. When the output port P22 goes high, the pulses from the pulse generator 203 are input to the clock input terminal CK through an AND gate G206 and the OR gate G207. The transistor Q211 is turned on/off and the clock pulses are sent to the camera through the terminal T4'. The data input/output device 22 outputs data from the data output terminal SO in response to the clock pulses. The transistor Q210 is turned on/off according to the data output through the AND gate G202. Since the output from the AND gate G206 is connected to the base of the transistor Q211 through a resistor R217, the transistor Q211 is turned on/off in response to the clock pulses from the pulse generator 23. When eight pulses are input to the clock input terminal CK, the data output is completed and the flag F21 is set. The CPU2 determines the end of data transmission. During data transfer, the data signal and the clock pulses are simultaneously output to control data transmission control without delay. Therefore, accurate transfer operation can be performed.

Flash photographing will be described below. Assuming that the shutter is released upon depression of the shutter button, the terminal 4c in the exposure control circuit in FIG. 1 goes low. An output from an inverter G7 goes high. Since the transistor Q9 is turned off, the current mirror circuit of transistors Q11 and Q12 is rendered inoperative to turn off the transistor Q10. When the shutter is fully open, the switch S2 is switched over from the position of the contact a to the position of the contact b. All three input terminals of an AND gate G8 are set at high level. When the terminal 4b goes high, the integrating capacitor C starts to be charged.

When the integrating capacitor C is charged to a predetermined voltage level, the exposure control circuit 4 supplies an emission stop signal to the terminal 4a to turn on the transistor Q13. The terminal T1 then goes low and the transistor Q201 in the flash unit is turned on to supply the emission stop signal to the emission control circuit 24, thereby stopping emission of the flash tube 25.

The functions of the ports P1 to P8 and P21 to P26 of the microcomputers 1 and 21 are summarized below.
P1: If high level, the terminal T3 is set at low level.
P2: If high level, the camera power source is kept on.
P3: If high level, the LED is enabled.

P4: If high level, the clock pulses are generated.
P5: If high level, the data transmission mode is set; and if low level, the data reception mode is set.
P6: A high level signal is input if the terminal T1 is set at low level.
P7: A low level signal is input upon closing of the switch S1.
P8: A low level signal is input when the terminal T4 is set at high level.
P21: If high level, the terminal T1' is set at low level.
P22: If high level, the clock pulses are generated.
P23: If high level, the data transmission mode is set; and if low level, the data reception mode is set.
P24: If high level, the current is supplied through the terminal T3' and the diodes D204 and D205.
P25: An output from the comparator 26 is received.
P26: A high level signal is input when light emission control is performed.

Figure 10:
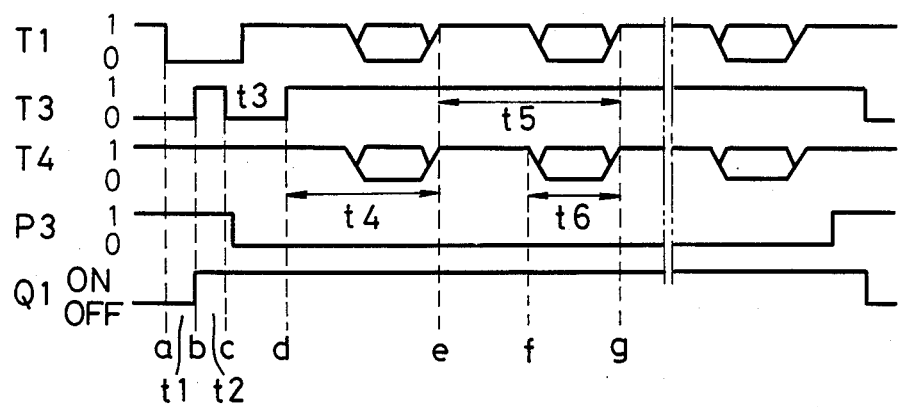
FIG. 10 is a timing chart for explaining the operation until data transfer between the camera and the flash unit is completed.
Figure 11:
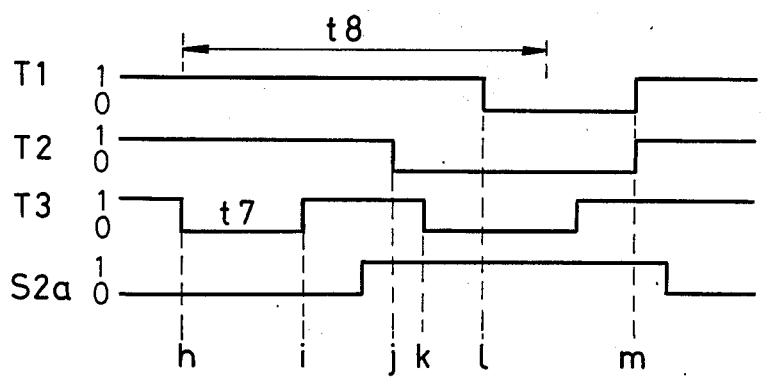
FIG. 11 is a timing chart for explaining flash photographing.

FIG. 10 is a timing chart up to the end of data transfer between the camera and the flash unit, and FIG. 11 is a timing chart for explaining flash photographing.

Referring to FIG. 10, the camera is energized at time a. A duration t1 has elapsed and then the transistor Q12 is turned on at time b to generate a voltage at the terminal T3. The CPU1 keeps the terminal T3 at high level for a predetermined duration t2. At time c, the terminal T3 goes low. Prior to data transfer, the CPU1 keeps the terminal T3 at low level for a duration t3 to execute the data transfer subroutine for flash unit. At time d, the terminal T3 goes high again. The data transfer is started from time d. Data is first sent from the camera to the flash unit. The longest transmission duration is set to be t4. Data exchange is started between the camera and the flash unit from time e. The longest data transmission or reception duration is set to be t5.

If the shutter release is performed in the camera at time h in FIG. 11, a current supplied from the camera to the terminal T3 is stopped. A duration t7 has elapsed and a current is supplied from the flash unit to the camera from time i. At time j, the exposure aperture is fully open and the switch S2 in the camera is switched over from the position of contact a to the position of the contact b. The flash tube starts emission at time k. At the time, current injection in the flash unit is interrupted and the emission start signal is sent to the camera. When an emission level becomes a predetermined value, the emission end signal is supplied from the camera to the flash unit at time l. The closing blades are closed at time m.

The operations of the flash photographing system of this embodiment will be described with reference to the flow charts in FIGS. 3 to 9.

(1) Camera Main Operation

Figure 3:
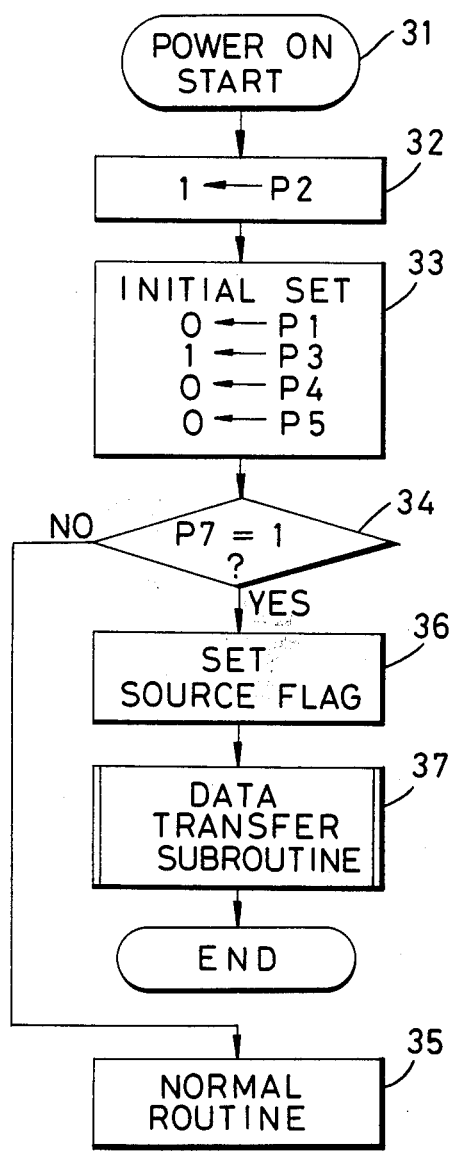
FIG. 3 is a flow chart for explaining the main operation of the camera.

Referring to FIG. 3, the power switch S1 is turned on upon depression of the shutter release button by a first stroke and the camera electrical circuit is energized. However, if the camera power switch S1 is off, a low level control signal is supplied from the flash unit to the camera through the terminals T1' and T1. The transistor Q1 is turned on to energize the camera (step 31).

Referring to FIG. 10, when the power switch is turned on at time a, the transistors Q1 and Q12 are turned on at time b and a voltage appears at the terminal T3. The CPU1 supplied the high level signal to the output port P2 to turn on the transistor Q2 and continues to energize the transistor Q1 (step 32). The CPU1 sets the output port P1 to low level, P3 to high level P4 to low level, and P5 to low level, thereby completing the initialization (step 33).

If the input port P7 is set at low level, the camera power switch S1 is turned on. Normal photographing of the camera can be performed. The CPU1 then executes the normal routine in step 35. More specifically, the camera performs normal photographing operations such as automatic exposure control, and data transfer with the flash unit. However, if the input port P7 is set at high level, the camera is energized in response to a command from the flash unit although the power switch S2 is kept off. The CPU1 sets the power flag (step 36) and the flow jumps to the data transfer subroutine (step 37). In this case, the camera does not perform photographing operation. The operations such as normal photographing and strobe photographing in the normal routine can be performed in the same manner as the conventional camera, and a detailed description thereof will be omitted.

(2) Flash Unit Main Operation

Referring to FIG. 4, the power switch S21 in FIG. 2 is turned on to energize the flash unit (step 401). The CPU2 performs initialization and the outputs from the output ports P21 to P24 are set at low level. The CPU2 checks if its X-interrupt terminal is set at low level (step 403). If YES in step 403, the switch S2 is switched over to the position of the contact b interlocked with the opening glades and the exposure aperture is fully open. The CPU2 waits the end of photographing. However, if NO in step 403, the shutter is rendered inoperative. If the Y-interrupt terminal is set at low level, the flow jumps to the Y-interrupt subroutine (step 405).

However, if the Y-interrupt terminal is set at high level, the terminals T3 and T3' are set at high level. The timer incorporated in the CPU2 is started (step 406) to check if data transfer from the camera to the flash unit is completed. If an actual data transfer duration t is longer than a predetermined duration t10, the CPU2 determines that the data transfer cannot be completed. In this case, caution or display is performed to indicate that the camera constituting the system is not suitable (step 408).

However, if the actual duration t is shorter than the predetermined time t10, the CPU2 determines that the data transfer can be properly completed. The CPU2 then checks if the data transfer flag is set at high level (step 409). If YES in step 409, the CPU2 determines that the data transfer is completed. The Y interrupt is prohibited and the data transfer flag is reset to display data such as photographing conditions on the display in the flash unit on the basis of the data transferred from the camera; otherwise, other processing is performed on the data transferred from the camera (steps 410 to 412). The Y interrupt is permitted, and the CPU2 checks in the Y-interrupt subroutine if data transfer is performed by checking if the transfer flag is set at high level (steps 413 and 414). If the transfer flag is set at high level, the flow returns to step 410 again and display based on the transferred data is maintained.

(3) Data Transfer Operation

The data transfer subroutine for camera in step 37 in FIG. 3 is shown in FIGS. 5A and 5B. The Y-interrupt subroutine of the flash unit in step 405 in FIG. 4 is shown in FIG. 7, and the data transfer subroutine for flash unit in step 706 in FIG. 7 is shown in FIG. 6.

The CPU1 sets the number of data transfer errors to be K=0 and the output port P1 to high level. The CPU1 causes the transistor Q8 to turn on, the transistor Q9 to turn off, and the current mirror circuit (Q11 and Q12) to turn off, thereby preventing the current from being supplied to the terminal T3 (steps 501 to 503). A low level signal is supplied to the flash unit through the terminals T3 and T3'. The CPU2 in the flash unit jumps from the main routine to the Y-interrupt subroutine according to step 404. In this case, the CPU2 sets the output port P3 at low level to cause the LED not to turn on. As described above, the Y-interrupt terminal is set at low level when the low level signal is sent from the camera to the flash unit through the terminals T3 and T3'. When the camera power switch is not turned on excluding the case described above or the terminal T1 is not arranged in the camera, the Y-interrupt terminal has been set at low level.

Figure 6:
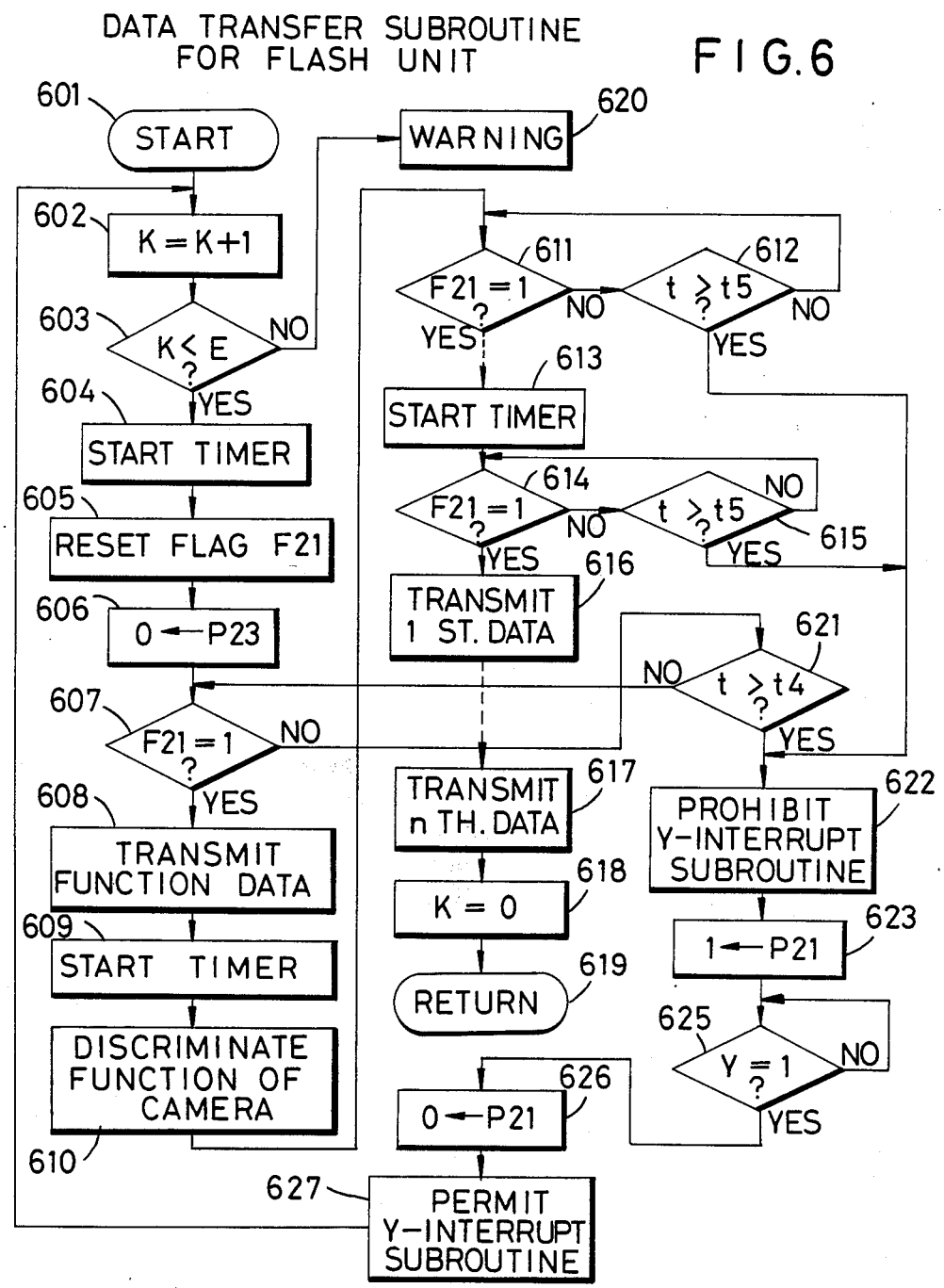
FIG. 6 is a flow chart for explaining the data transfer operation of the flash unit.
Figure 7:
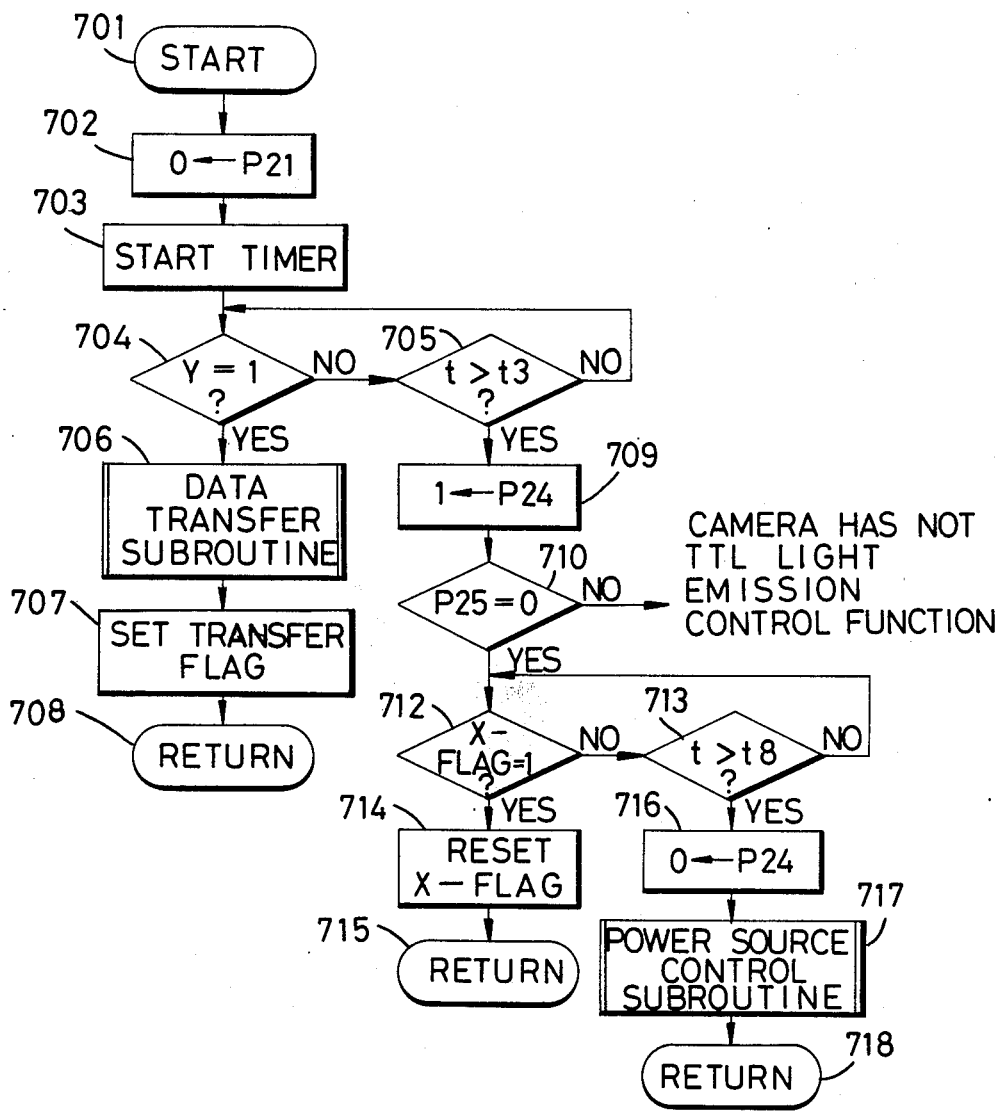
FIG. 7 is a flow chart for explaining the Y-interrupt operation.

If the Y-interrupt terminal is set at low level, the flow jumps to the Y-interrupt subroutine in FIG. 7. Referring to FIG. 7, when the Y-interrupt routine is started, the CPU2 in the flash unit sends a low level signal to the output port P21 to start the timer so as to check if the Y-interrupt terminal is set at high level (steps 701 to 704). In this case, the CPU1 in the camera sets the output port P1 at high level and then at low level when the duration t3 (FIG. 10) has elapsed (steps 503 to 506). Therefore, the terminals T3 and T3' go high to turn on the transistor Q205 of the flash unit. At the same time, the Y-interrupt terminal goes high. Therefore, the Y-interrupt terminal is determined to be high level in step 704, and the flow jumps to the data transfer subroutine for flash unit in FIG. 6 (step 706).

In the data transfer subroutine shown in FIG. 6, K is substituted by (K+1) (step 602). The number K is compared with a predetermined value E. If K<E, then the CPU2 causes the timer to start and resets the flag F21 (steps 603 to 605). The output port P23 is set at low level. The clock pulses are supplied from the camera to the clock input terminal CK2 of the data input-output device 22 through the terminal T4' and the data is ready for input to the input terminal SI of the data input/output device 22 through the terminal T1' (step 606).

After the CPU1 sends the low level signal to the output port P1 in step 507 in FIG. 5, function data representing the function and the type of camera (e.g., a TTL emission control camera, a camera capable of transmitting data, etc.) is supplied from the memory of the CPU1 to the data input/output device 2 and the flag F1 is reset. Subsequently, the CPU1 sends a high level signal to the output port P5 to set the system in the data transmission mode. The CPU1 then sends a high level signal to the output port P4 to operate the pulse generator 3. The clock pulses appear at the terminal T4. After data transmission, the serial data input/output device 2 sets the flag F1 and sets the output port P5 at high level.

The data transfer from the flash unit to the camera is executed. Referring to FIG. 6, when the data input/output device 22 completely receives the data from the camera, the flag F21 is set at high level. When the flag F21 is set at high level, the flash unit sends function data (e.g., data representing a strobe for sending data to camera) in the following manner (steps 607 and 608). The CPU2 sends a high level signal to the output port P23 and sets the system in the data transmission mode. The CPU2 sends a high level signal to the output port P22 to supply the clock pulses to the camera through the terminal T4'. At the same time, the CPU2 causes the data appear at the output terminal SO of the data input-output device 22 so as to send the data to the camera through the terminal T1'.

If the CPU2 determines in step 607 that the flag F21 is set at low level, the CPU2 checks in step 621 if this state continues for the duration t4 from the timer start. In this case, the duration t4 is a longest duration of each data transmission after the terminal T3 is set at high level. If NO in step 621, the CPU2 determines that the camera function data is not properly received. In this case, the CPU2 prohibits Y-interrupt subroutine and sets the output port P21 at high level. A low level signal appears at the terminal T1' and then the terminal T1 to acknowledge to the camera that the data cannot be received (steps 622 and 623). In response to the data from the flash unit, the input port P6 is set at high level. The CPU2 waits until the Y-interrupt terminal is set at high level (step 625). The CPU2 sets the output port P21 at low level (step 626) to permit the interrupt of the Y-interrupt subroutine (step 627). The flow returns again to the data transfer routine for reading the camera function data. If the number of repetitions exceeds the loop number E, caution display is performed or the data transfer subroutine is interrupted (step 620).

Referring to FIG. 5, after the CPU1 in the camera sends the function data, it resets the flag F21, sets the output port P5 at low level, and checks the input port P6 (step 508). If the input port P6 is set at high level, the camera function data cannot be accurately received by the flash unit. In this case, let K be K+1 (step 513). The updated K is compared with the loop number E. If K>E, then caution display is performed or the data transfer is interrupted. The flow returns to step 34 of the routine in FIG. 3 (step 519). However if K<E, then the flow returns to the beginning of the data transfer routine and the routine for transmitting the data from the camera is performed.

If the input port P6 is set at low level in step 508, the CPU2 determines that the camera function data is accurately received by the flash unit. The following operation is performed in the camera. The timer is started to supply the flash unit function data to the input terminal SI in the data input/output device 2 through terminals T1' and T1. When the function data is accurately received, the input/output device 2 sets the flag F1 at high level (step 509).

When the flag F1 is not set during the longest duration (FIG. 10) required for transmitting or receiving the next data after the end of transmission or reception of one data, the CPU1 determines that the data from the flash unit is not properly received and checks again if the input port P6 is set at low level (steps 510, 516, and 517). If the input port P6 is determined to be high level, the terminal T1 is latched to low level by the flash unit. Therefore, K is substituted again by K+1; if K<E, then the output port P1 is set at high level, and the flow returns to the original routine (steps 513, 514 and 503).

When the function data from the flash unit is completely input and the flag F1 is set at high level, the CPU1 determines the contents of the data in the data input/output device 2. The flash unit function is determined and the flag F1 is reset (steps 510 and 511). By acknowledging the functions between the camera and the flash unit, the type and number of data to be transmitted can be determined.

In order to check if the flash unit function is properly acknowledged, the CPU1 checks the input port P6 in step 512. If the CPU1 determines that the input port P6 is set at high level, proper data reception cannot be performed. The flow returns to the original routine through steps 513 and 514 or through steps 514, 515 and 519.

If the CPU1 determines in step 512 that the input port P6 is set at low level, the CPU1 sends the first camera data such as an F-number of the photographing lens in the same procedure as in the function data and determines if the input port P6 is set at low level (steps 520 and 521). If the input port P6 is determined to be low level, the CPU1 sends the second data such as a speed of a film loaded in the camera and similarly sends data up to the nth data (steps 522 and 523). The timer is then operated (step 524).

In the flash unit, as shown in FIG. 6, after the flash unit function data is sent, the CPU2 resets the flag F21 and causes the timer to start so as to identify the type of camera through the terminals T1 and T1' (steps 609 and 610). Subsequently, the CPU2 checks if the flag F21 is set at high level within the duration t5 (steps 611 and 612). Similarly, the CPU2 receives the first to nth camera data and sets the flag F21 for each camera data. In each operation, if the flag F21 is not reset within the duration t5, the corresponding camera data has not been received by the flash unit and the Y-interrupt routine is prohibited (step 622). A high level signal appears at the output port P21 and the terminal T1' is set at low level. The CPU2 is operated according to the routine through steps 625 to 627. The routine is repeated. If the number of repetitions is below the loop number E, the caution display is performed.

When the CPU2 receives the last, nth data, it sends the first data (e.g., a guide number) back to the camera. When the CPU2 subsequently sends back the data up to the nth data, it sets K=0 and the flow returns from step 706 of the Y-interrupt subroutine (FIG. 7) to step 404 of the main routine (FIG. 4). If the terminal T3' is set at low level during the execution of the data transfer subroutine (i.e., the flash unit data cannot be received by the camera), the flow returns to the Y-interrupt subroutine.

When data transfer is completed, the transfer flag is set. The Y-interrupt subroutine is prohibited, the transfer flag is reset, and control operations such as display and other necessary operations are performed (steps 410 to 412). These operations are completed, the Y-interrupt subroutine is permitted, and the next Y-interrupt subroutine is performed. The CPU2 waits until data transfer is completed. When this data transfer is completed, the transfer flag is set again, and the Y-interrupt subroutine is prohibited, thereby repeating the routine (steps 410 to 414).

Meanwhile, the camera performs the flash unit data reception from step 524 of FIG. 5 in the same manner as in camera function data reception.

The sequentially received flash unit data signals are stored in the RAM in the CPU1 through the data input-output device 2. When the last data is received, the CPU1 checks that the terminal T1 is not set at low level, i.e., that the input port P6 is not set at high level (step 531). The CPU1 then checks in step 535 if the power flag is set at low level. If YES in step 535, then the output port P2 is set at low level, the camera power switch is turned off, and data transfer is completed (steps 536 and 537). However, if NO in step 535, the camera power switch has been turned on and the system is ready for flash photographing. The CPU1 sets the output port P3 at high level to turn on the transistor Q7. The LED for indicating that the flash is ready is turned on, and the flow returns to the normal routine (steps 538 and 539).

(4) Data Transfer Operation during Off State of Camera Power Switch

When the camera power switch S1 is off while the flash unit power switch S21 is turned on, a low level signal is input to the Y-interrupt terminal. The Y-interrupt subroutine in step 405 is performed.

When the Y-interrupt subroutine in FIG. 7 is started, the CPU2 sets the output port P21 at low level and causes the timer to start (step 703). The Y-interrupt terminal is kept low the duration t3 after the start of the timer since the camera power switch is kept off. Therefore the CPU2 sets the output port P24 at high level and supplies the current to the terminal T3' (steps 704, 705 and 709). The output from the comparator 27 is kept low, as described above, and at the same time the input port P25 is set low. Since the camera has not operated, an X flag is not set even after the duration t8 (i.e., the longest duration in which the emission of the flash tube lasts from the shutter release in the camera). The CPU2 sets the output port P24 at low level and determines that the camera power switch is kept off. Then, the flow jumps to the power source off subroutine (steps 712, 713, 716 and 717). The power source control subroutine for camera will be described with reference to FIG. 9.

Figure 9:
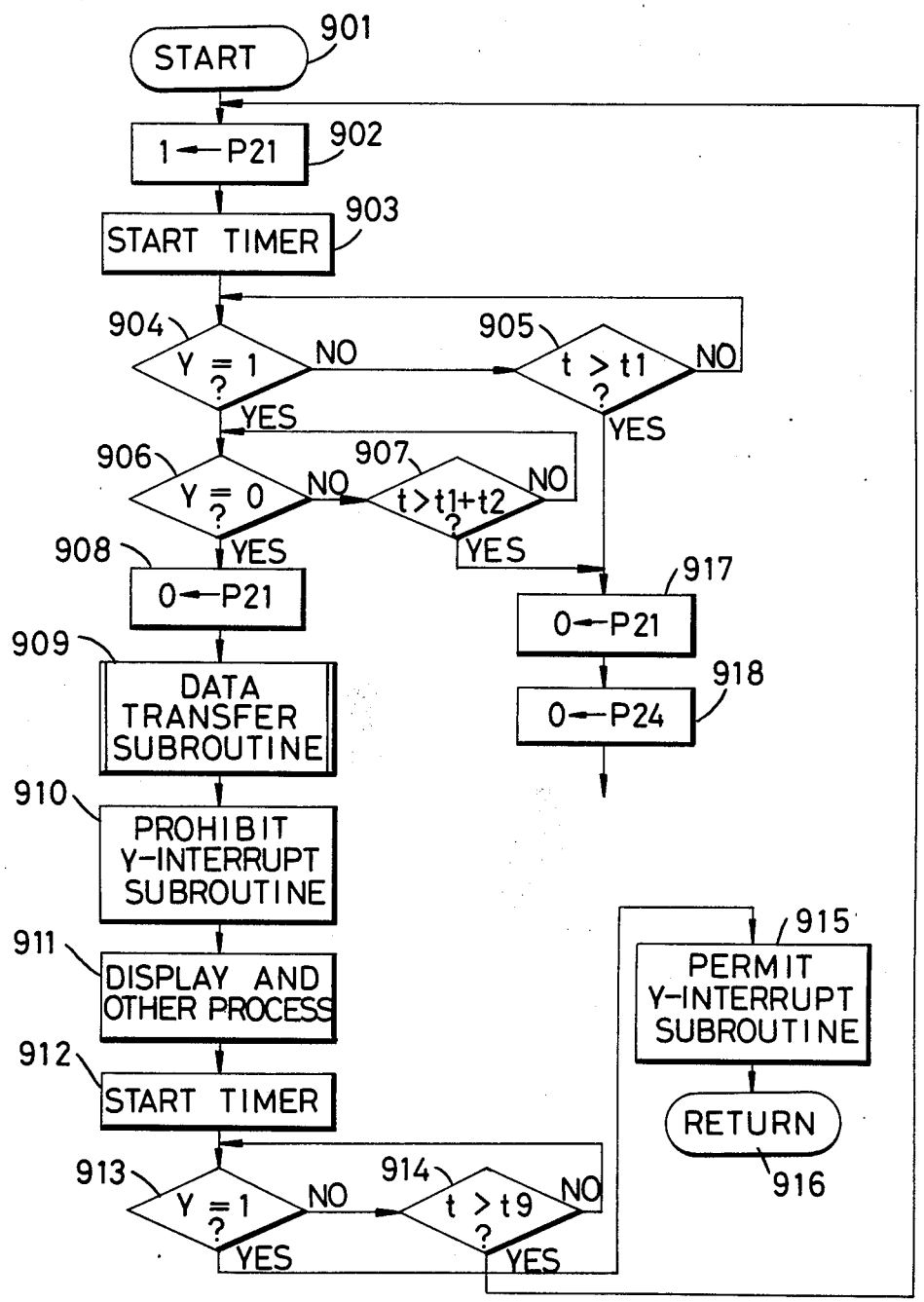
FIG. 9 is a flow chart for explaining the power source control subroutine.

Referring to FIG. 9, the CPU2 sets the output port P21 at high level to cause the low level signal to appear at the terminal T1'. In this case, the transistor Q1 is turned on in the camera to supply power to the respective components thereof. As soon as the power is supplied to the components, a current appears at the terminal T3. The current is also supplied to the CPU1 to set the output port P2 at high level and turn on the transistor Q2 to keep the transistor Q1 on. The CPU1 then performs initialization. Since the camera power switch is kept on, the input port P7 is kept high. The CPU1 sets the power flag and jumps to the data transfer subroutine described above.

Meanwhile, in the flash unit, since the terminal T1' is set at low level. After the camera power switch is turned on, the timer is started (step 903). The CPU2 then checks if the Y-interrupt terminal is set at high level (step 904). The CPU2 causes the timer to start and checks that the Y-interrupt terminal goes high due to current injection from the terminal T3' within the duration t1 (the longest duration of the camera power rising). If the terminal T3' goes low within a duration(t1+t2), it indicates that the camera can transfer the data so that the low level signal appears at the output port P21 (steps 906 to 908). The flow jumps to the above-mentioned data transfer subroutine and data is exchanged between the camera and the flash unit.

When data transfer is completed, the CPU1 sets the output port P2 at low level to turn off the power since the power flag is set. At the same time, the CPU2 prohibits the Y-interrupt subroutine after data transfer is completed. The CPU2 thus performs display and other control operations(e.g., charging of the main capacitor) and causes the timer to start (steps 910 to 912). When the Y-interrupt terminal is set at high level, i.e., the power switch is turned on, the CPU2 permits the Y-interrupt subroutine, and the flow returns to step 414 of the main routine in FIG. 4. If the camera power switch is not turned on within the duration t9 (i.e., the duration in which the flash unit requests the data for the camera) from the start of the timer, the CPU2 sets the output port P21 again at high level to restore the on state of the camera power switch, thereby performing the next data transfer.

(5) Camera Normal Routine Operation

When the shutter release in the camera is performed after data transfer between the camera and the flash unit is completed, the terminal 4c in the exposure control circuit 4 in FIG. 1 goes low to turn off the transistor Q9 and sets the terminal T3 at low level. The Y-interrupt terminal of the flash unit is set at low level to start the Y-interrupt subroutine in FIG. 7. In this case, since the terminal T3 is set at low level, it cannot go high within the duration t3. The CPU 2 sets the output port P24 at high level and causes the transistors Q207 and Q208 to turn on (step 709). At this time, the transistor Q206 is turned off, and the current mirror circuit of transistors Q202 and Q204 is operated. Currents are supplied to the terminals T3' and T4'.

Upon operation of the current mirror circuit, a voltage at the terminal T3' is supplied to the inverting input terminal of the comparator 27 and the voltage across the resistor R213 is supplied to the noninverting input terminal thereof. The voltage appearing at the terminal T3' is equal to that across the resistor R21, i.e., the camera terminal T3. An output from the comparator 27 is determined by the camera resistor R21 and the flash unit resistor R213. Since resistance of the resistor R21 is smaller than that of the resistor R213, the output from the comparator 27 is set at low level. The input port P25 is set at low level. The CPU2 determines in step 710 that the input port P25 is set at low level, and the flow advances to the next step.

When the exposure aperture is fully open after the shutter release in the camera, the switch S2 is changed over to the position of the contact a to the position of the contact b to set the terminal T2 at low level, thereby operating the flash tube. The emission start signal appears at the terminal 24f of the emission control circuit 24 to turn on the transistor Q209. The terminal T3' goes low to turn off the camera transistor Q10. At this time, since all the inputs to the AND gate G8 are set at high level, an output therefrom is set at high level to start charging the integrating capacitor C. When the integrating capacitor C is charged to a predetermined level, the emission stop signal is output from the terminal 4a of the exposure control circuit 4 to turn on the transistor Q13. Upon operation of the transistor Q13, the exposure control circuit 4 sets the terminals T1 and T1' at low level and causes the transistor Q201 to turn on. Therefore, the emission stop signal (low level) is sent to the terminal 24e of the emission control circuit 24, thereby stopping the emission.

When the terminal T2' is set at low level upon full opening of the aperture, the CPU2 starts an X-interrupt subroutine since the output from a buffer G208 goes low to supply a low level signal to an X-interrupt terminal.

Figure 8:
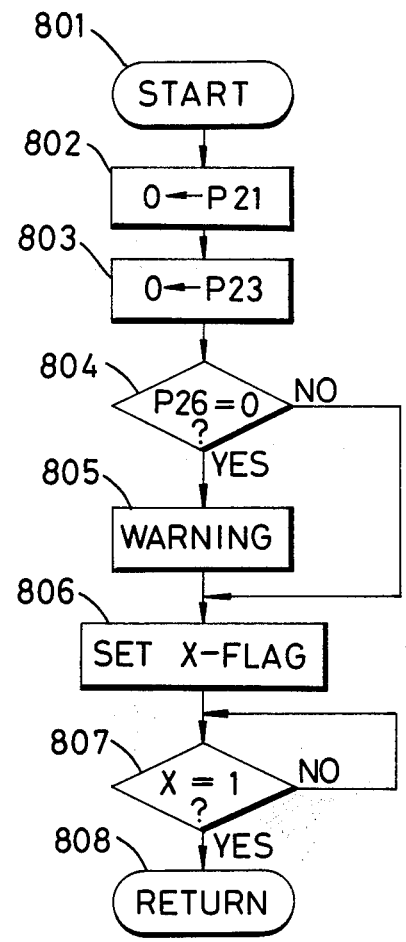
FIG. 8 is a flow chart for explaining the X-interrupt operation.

The X-interrupt subroutine will be described with reference to FIG. 8. Referring to FIG. 8, the CPU2 sets the output ports P21 and P23 at low level and checks if the input port P26 is set at low level, i.e., if the emission stop signal is received (steps 802 to 804). If the input port P26 is determined to be low level, the flash tube 25 has emitted light with a maximum level, and the emission control error is indicated (step 805). However, if the input port P26 is determined to be high level, the CPU2 determines that emission control is completed. The CPU2 then sets the X flag. If the X flag has been set at high level, the terminal T2' has opened, (i.e., the switch S2 is changed over from the position of contact b to the position of the contact a in synchronism with the shutter release in the camera). The CPU2 determines the above operation, and the flow returns to the routine of steps 712 and 713 in FIG. 7.

Since flash photographing and emission control are completed within the duration t8, the X flag is reset, and the flow returns to the routine in FIG. 4. The CPU2 waits until the transfer flag is set (step 714).

If a flash unit having no data transfer function is connected to the camera of this embodiment, or a camera having no data transfer function is connected to the flash unit of this embodiment, the CPU1 in the camera and the CPU2 in the flash unit are arranged to independently determine such connection.

More specifically, after data is sent from the camera to the flash unit, the camera waits data reception from the flash unit for the duration t8. However, if the data transfer function is not provided, the outputs at the terminals T1'0 to T4 in the flash unit are not updated. The CPU1 in the camera determines that the flash unit does not have the data transfer function, and the flow returns to the normal routine.

If the camera does not have the data transfer function, the Y-interrupt terminal is kept low even after the duration t1 in steps 904 and 905. The CPU2 sets the output port at low level and determines that the camera does not have the data transfer function.

What is claimed is:

1. A flash photographing system comprising:
   a flash unit including flash emitting means and data control means, said flash emitting means being provided with a flash tube and circuit means for energizing said flash tube, said data control means being provided with data generating means for generating first data concerning with said flash unit, data reading means, and means for generating a control signal prior to the first data;
   a camera including power source means, power source control means for enabling said power source means in response to the control signal, and data control means driven by said power source means, and said data control means being provided with data generating means for generating second data concerning said camera, and data reading means; and
   transfer means, connecting said flash unit to said camera, for transferring the control signal from said flash unit to said power source control means of said camera, the first data from said flash unit to said data control means of said camera, and the second data from said camera to said data control means in said flash unit.

2. A system according to claim 1, wherein said data control means of said flash unit includes processing means for generating the first data from said data generating means after the second data transmitted by said transfer means is read by said reading means.

3. A system according to claim 1, wherein said data control means in said flash unit and said data control means in said camera include processing means for serially controlling corresponding data generating means and corresponding data reading means, said transfer means being provided with a common path arranged between said flash unit and said camera so as to transmit the first and second data.

4. A system according to claim 1, wherein said power source control means of said camera diables said power source means when said data reading means in said camera and said flash unit complete reading of the first and second data.

* * * * *